3,533,946
HYDROCARBON OILS CONTAINING DIESTERS OF 4,4'-STILBENEDICARBOXYLIC ACID
Robert J. Hartle, Gibsonia, Pa., assignor to Gulf Research & Development Company, Pittsburgh, Pa., a corporation of Delaware
No Drawing. Filed Apr. 14, 1967, Ser. No. 630,825
Int. Cl. C10m 1/26
U.S. Cl. 252—57          6 Claims

ABSTRACT OF THE DISCLOSURE

Diesters of 4,4'-stilbenedicarboxylic acid are admixed with hydrocarbon oils to inhibit degradation and deterioration of such oils when exposed to ultraviolet radiation.

BACKGROUND OF THE INVENTION

This invention relates to compounds which impart to hydrocarbon oils superior resistance to degradation and deterioration when they are exposed to actinic radiation and in particular to ultraviolet radiation.

Various organic compounds exhibit the power to absorb electromagnetic radiation within the band of 100 to 3900 A. These absorbers have many applications. For example, they are used in plastics principally for stabilization of polymers or secondary ingredients against photocatalyzed deterioration and in glazing, coating and packaging materials for the purpose of making them capable of screening ultraviolet light. Ultraviolet absorbers, which must necessarily have high ultraviolet absorptivity and be stable to ultraviolet radiation, must also be (1) substantially free of color (initially and after aging); (2) compatible with the material with which they are used; and (3) inert to other additives, processing and weathering.

Numerous organic compounds have been suggested for the range of radiation described above, which range is described as the ultraviolet range. Among the commonly used ultraviolet agents now in use are phenyl salicylate, t-butyl phenyl salicylate, 2,4-dihydroxy benzophenone, alkylated 2-hydroxyphenyl benzotriazole, etc.

By far, the greatest concern with respect to ultraviolet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultraviolet radiation. Many commercial products are either unstable when subjected to such radiations, or are affected to the extent that they become undesirable or unusable. Many plastic materials, when exposed to this radiation, undergo substantial degradation resulting in the development of undesirable color bodies and subsequent loss of transparency. Food products, in addition to becoming discolored, often become unfit for human consumption. It is well known that colored objects such as dyed textiles will fade on exposure to sunlight and in particular to ultraviolet light. Many plastics, in addition to developing color formation and reduction of transparency, become brittle, lose their elasticity, crack and eventually completely deteriorate on exposure to sunlight. Paints, varnishes, lacquers, lubricating oils and the like are also prone to these effects.

SUMMARY OF THE INVENTION

I have discovered that hydrocarbon oils can be protected against the adverse effects of ultraviolet radiation by incorporating therein controlled amounts of diesters of 4,4'-stilbenedicarboxylic acids. By the term "hydrocarbon oil" I mean any refined petroleum oil in the lubricating oil range. These oils can be paraffinic or naphthenic distillate oils or bright stocks having viscosities of from about 60 seconds at 100° F. to about 2000 seconds at 100° F. Examples of such hydrocarbon oils are solvent refined naphthenic distillates having viscosities of from 100 seconds to 1200 seconds at 100° F.; hydrogen processed, West Texas distillates having viscosities of from 100 seconds to 1900 seconds at 100° F.; and solvent refined, hydrogen-treated, dewaxed, paraffinic base oils having viscosities of from 100 seconds to 600 seconds at 100° F. (All viscosities referred to above and hereinafter are Saybolt Universal Viscosities determined by the American Society for Testing and Materials method D88–56.) The compounds of my invention which I have found to be extremely useful as ultraviolet absorbing agents when incorporated into hydrocarbon oils can be identified by the general formula:

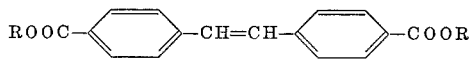

where R is an alkyl group, having from 1 to 14 carbon atoms, preferably from 4 to 10 carbon atoms. Specific examples of the diesters of 4,4'-stilbenedicarboxylic acids that can be used include dimethyl 4,4'-stilbenedicarboxylate,
diethyl 4,4'-stilbenedicarboxylate,
di-n-propyl 4,4'-stilbenedicarboxylate,
di-iso-propyl 4,4'-stilbenedicarboxylate,
di-n-butyl 4,4'-stilbenedicarboxylate,
di-iso-butyl 4,4'-stilbenedicarboxylate,
di-tert-butyl 4,4'-stilbenedicarboxylate,
di-n-pentyl 4,4'-stilbenedicarboxylate,
di-n-hexyl 4,4'-stilbenedicarboxylate,
di-n-heptyl 4,4'-stilbenedicarboxylate,
di-2-ethylbutyl 4,4'-stilbenedicarboxylate,
di-n-octyl 4,4'-stilbenedicarboxylate,
di-iso-octyl 4,4'-stilbenedicarboxylate,
di-2-ethylhexyl 4,4'-stilbenedicarboxylate,
di-n-decyl 4,4'-stilbenedicarboxylate,
di-iso-decyl 4,4'-stilbenedicarboxylate,
di-undecyl 4,4'-stilbenedicarboxylate,
di-n-dodecyl 4,4'-stilbenedicarboxylate,
di-n-tetradecyl 4,4'-stilbenedicarboxylate.

DESCRIPTION OF THE INVENTION

The stilbene diester compounds of my invention can be obtained in any suitable manner, for example, by esterifying stilbenedicarboxylic acids. These acids are easily obtained by well known prior art procedures, for example, as outlinend in U.S. Pats. 2,677,703 and 2,688,631 and in the Journal of the American Chemical Society, vol. 75, p. 2263 (1953). I have found the following procedures particularly suitable in preparing the ultraviolet agents of the present invention.

Initially 4,4'-stilbenedicarboxylic acid is produced by dehydrodimerizing p-toluic acid with sulfur as shown by the following equation:

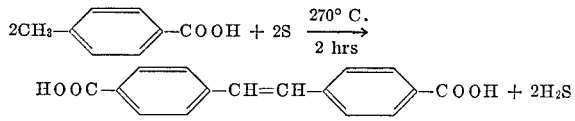

The major by-product of this reaction is a sulfur-containing polycarboxylic acid which is removed by solvent extraction. Free 4,4'-stilbenedicarboxylic acid can be obtained in high purity by recrystallization of its potassium salt. Yields (based on the amount of p-toluic acid reacted) of up to 70 percent can be obtained by increasing the ratio of p-toluic acid to sulfur. The free acid is then converted to the acid chloride by refluxing the acid in excess thionyl chloride.

Treatment of the stilbene acid chloride with an excess of alcohol results in the formation of the desired esters of the present invention. Thus any alcohol which will react with the stilbene acid chloride to form 4,4'-stilbene diesters defined herein is suitable for preparing the agents of the present invention. Because of their commercial availability and relatively inexpensive cost, I prefer to utilize lower alkyl alcohols containing from 1 to 14 carbon atoms in preparing the stilbene diesters of my invention.

The following examples will further illustrate my invention.

Examples I–IX

Diester of 4,4'-stilbenedicarboxylic acid were prepared as follows: p-toluic acid (136 grams) and sulfur (32 grams) were heated together at reflux (265°–271° C.) for 2.5 hours with stirring. Hydrogen sulfide was evolved and a yellow solid was precipitated as the reaction progressed. The reaction mixture was allowed to cool and then extracted with boiling xylene (two 300 milliliter portions) followed by two extractions with boiling dioxane (two 200 milliliter portions). The crude product which remained was dissolved in 1200 milliliters of hot 3 percent potassium hydroxide solution and filtered. The free acid (4,4'-stilbenedicarboxylic acid) was recovered from the filtrate by precipitation with excess 6 N hydrochloric acid followed by a digestion period of 2 hours at 80°–90° C. A very pure product was obtained by allowing the filtrate to cool, thereby crystallizing the potassium salt. The potassium salt was redissolved in hot water and the free acid precipitated as before.

The purified 4,4'-stilbenedicarboxylic acid was finely ground and 20 grams of it were added to 125 grams of thionyl chloride. A few drops of triethylamine was added as a catalyst and the mixture was refluxed with stirring until evolution of hydrogen chloride had stopped. Excess thionyl chloride was distilled off and the residual product heated to about 100° C. under vacuum. The resulting acid chloride of 4,4'-stilbenedicarboxylic acid was then refluxed in an excess of an appropriate alcohol; the choice of alcohol depending on which specific 4,4'-diester was desired. Thus, the diethyl ester was prepared by adding 500 milliliters absolute ethanol to 64 grams of 4,4'-stilbenedicarboxylic acid chloride and the mixture refluxed for 6 hours. The hot solution was filtered and the residual solid extracted with boiling ethanol until all soluble material was removed. The extracts and original filtrate were combined. The product which crystallized out on cooling was redissolved in ethanol, heated with decolorizing charcoal, filtered and cooled. The diethyl ester was obtained as colorless plates having a melting point of 126°–128° C. In like manner, the di-n-butyl ester of 4,4'-stilbenedicarboxylic acid was obtained.

Several samples of diethyl and di-n-butyl 4,4'-stilbenedicarboxylate were then admixed with a hydrocarbon oil. The oil was a solvent extracted, dewaxed, hydrogen treated paraffinic base oil having the following properties:

Gravity, ° API _____ 32.4
Viscosity, SUV, sec.:
  At 100° F _____ 106
  At 210° F _____ 40
Viscosity Index _____ 100
Boiling Range, ° F _____ 721–842

Concentrations of these admixtures are shown in Table I. The oil-ester mixtures were then placed in quartz tubes and exposed to ultraviolet radiation, the source of which was a mercury arc lamp. The lamp was an Eveready Carbon Arc Solarium having an output equivalent to three times the intensity of June sun light. In like manner, samples of oil without any additive and with a commercially available additive (2,2'-dihydroxy-4-methoxybenzophenone) were subjected to ultraviolet radiation. The radiation was allowed to continue for 8 hours, with periodic color determinations, using ASTM method D1500, being made at 4 hour intervals to determine color changes in the oil. Comparative color determinations were also made on admixtures containing diesters of 2,2'-stilbenedicarboxylic acid. The results of these determinations are summarized in Table I.

TABLE I.—STILBENEDICARBOXYLIC ACID ESTERS AS UV STABILIZERS
[Lubricating Oil: D1500 color=0.3]

| Additive | Concentration, percent by wt. | Change in D1500 color, estimated to 0.1 unit | | |
|---|---|---|---|---|
| | | 0 hrs. | 4 hrs. | 8 hrs. |
| None | | | 0.6 | 0.9 |
| Diethyl 4,4'-stilbenedicarboxylate | 0.10 | 0 | 0.1 | 0.2 |
| Di-n-butyl 4,4'-stilbenedicarboxylate | 0.05 | 0 | 0.3 | 0.4 |
| Do | 0.10 | 0 | 0.2 | 0.3 |
| Do | 0.25 | 0 | 0.1 | 0.2 |
| Stilbene | 0.10 | 0 | 0.4 | 0.6 |
| 2,2'-dihydroxy-4-methoxybenzophenone | 0.10 | 0 | 0.1 | 0.1 |
| Diethyl 2,2'-stilbenedicarboxylate | 0.05 | 0 | 0.4 | 0.5 |
| Do | 0.10 | 0 | 0.5 | 0.6 |

From the data contained in Table I, it will be seen that the addition of diesters of 4,4'-stilbenedicarboxylic acid to hydrocarbon oils has a substantial stabilizing effect and prevents deterioration of the oil when exposed to ultraviolet radiation. Furthermore, diesters of 4,4'-stilbenedicarboxylic acid have stabilizing qualities which are comparable to those of existing commercial agents. In addition, it will be seen from the data in Table I that diesters of 4,4'-stilbenedicarboxylic acid are unique in their stabilizing characteristics when compared to other stilbene carboxylic acid ester isomers. Thus, when diethyl 2,2'-stilbenedicarboxylate was admixed with the oil the color change was three times as great as when an equal concentration of 4,4'-diethyl stilbenedicarboxylic acid ester was present.

Example X

The di-octyl ester of 4,4'-stilbenedicarboxylic acid was prepared by reacting isooctanol with the acid chloride of 4,4'-stilbenedicarboxylic acid in accordance with the method described in Examples I–IX. The di-iso-octyl ester was admixed with a lubricating oil and the oil was exposed to ultraviolet radiation, the source of which was a 450 watt Hanovia high pressure mercury arc lamp. Color determinations using ASTM method D1500 were made after 24 hours of exposure. Comparable determinations were made with the di-butyl ester of 4,4'-stilbenedicarboxylic acid and a commercial stabilizer. The results of these tests are summarized in Table II.

TABLE II
[Lubricating Oil:[1] D1500 color=L.05]

| Additive | Concentration, percent by wt. | Hours exposed to ultraviolet radiation | Color (ASTM D1500) |
| --- | --- | --- | --- |
| None | | 24 | 2.5 |
| Di-iso-octyl 4,4'-stilbenedicarboxylate | 0.5 | 24 | L1.0 |
| Di-n-butyl 4,4'-stilbenedicarboxylate | 0.1 | 24 | L2.0 |
| 2,2-dihydroxy-4-octoxy benzophenone | 0.1 | 24 | L1.0 |

[1] Gravity, °API, 33.4, Viscosity, SUV, at 100° F.=100.7 seconds, at 210° F.=39.5 seconds, Boiling Range 744–845° F.

It is to be understood that the above examples are illustrative only and are not intended as limiting the scope of my invention. Thus there can be substituted in the foregoing examples other stilbene diesters in different concentrations, and other methods for preparing the diesters can be employed, and the desired results, illustrated above, will still be obtained.

I claim:

1. A composition of matter which comprises in admixture a major portion of a hydrocarbon lubricating oil and a 4,4'-diester of stilbene having the formula:

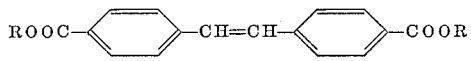

where R is an alkyl group, said compound being present in sufficient amount so as to render the composition stable when exposed to ultraviolet radiation.

2. The composition of claim 1 wherein the diester of stilbene is present in an amount of from about .10 percent by weight to about .25 percent by weight.

3. The composition of claim 1 wherein R is a lower alkyl group containing from 1 to 14 carbon atoms.

4. The composition of claim 1 wherein said diester is diethyl 4,4'-stilbenedicarboxylate.

5. The composition of claim 1 wherein said diester is di-n-butyl 4,4'-stilbenedicarboxylate.

6. The composition of claim 1 wherein said diester is di-iso-octyl 4,4'-stilbenedicarboxylate.

References Cited

UNITED STATES PATENTS

| | | |
| --- | --- | --- |
| 2,688,631 | 9/1954 | Toland. |
| 2,944,912 | 7/1960 | Kopley 252—300 |
| 3,004,916 | 10/1961 | Ertelt 252—50 |
| 3,246,983 | 4/1966 | Sus et al. 252—300 |
| 3,403,967 | 10/1968 | Stanley 252—52 |

DANIEL E. WYMAN, Primary Examiner

J. M. HICKEY, Assistant Examiner

U.S. Cl. X.R.

252—300